April 13, 1954

B. W. KEESE ET AL 2,674,892

POWER TAKE-OFF MECHANISM

Filed Aug. 7, 1947

INVENTORS
Beverly W. Keese
BY Charles A. Cook

Strauch & Hoffman
Attorneys

INVENTORS
Beverly W. Keese
Charles A. Cook
BY Strauch & Hoffman
Attorneys

April 13, 1954     B. W. KEESE ET AL     2,674,892
POWER TAKE-OFF MECHANISM
Filed Aug. 7, 1947     3 Sheets-Sheet 3
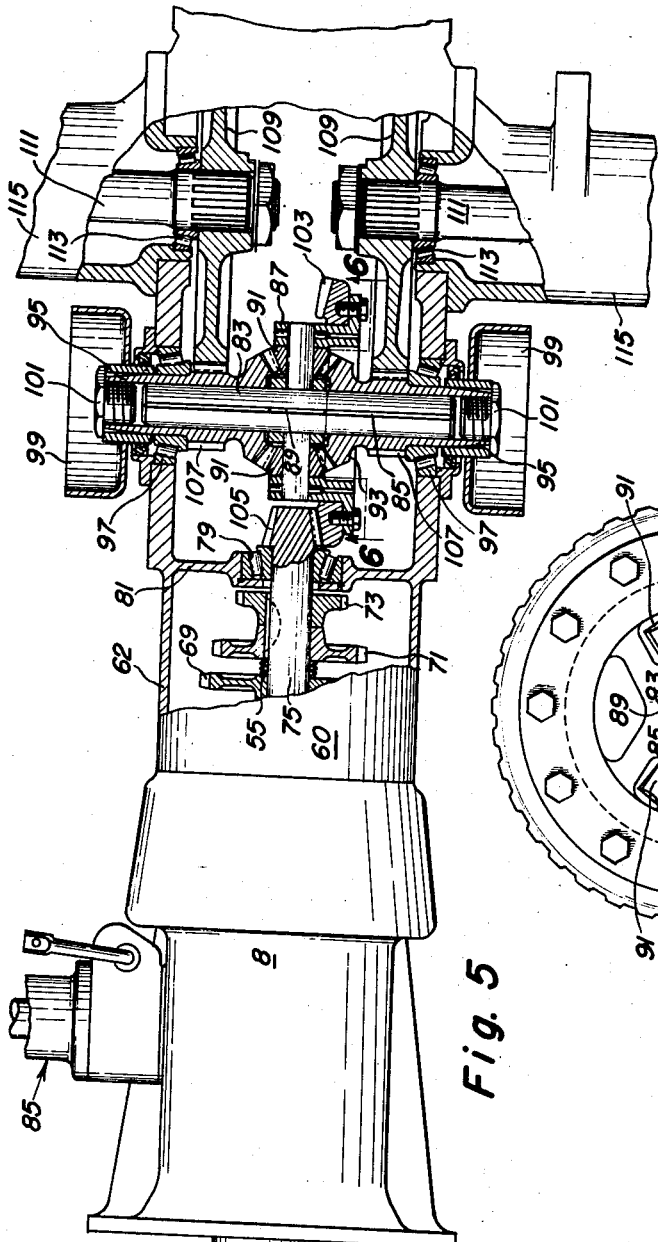
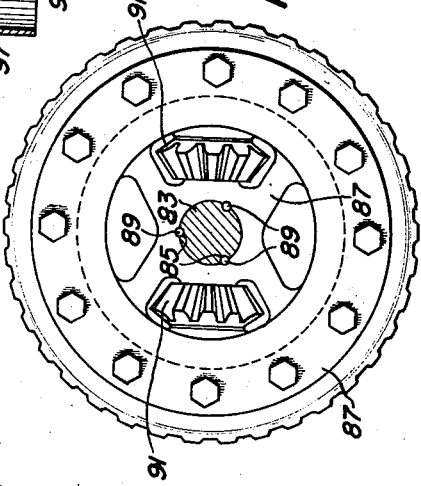
INVENTORS
Beverly W. Keese
BY Charles A. Cook
Strauch & Hoffman
Attorneys Patented Apr. 13, 1954

2,674,892

UNITED STATES PATENT OFFICE 2,674,892

POWER TAKE-OFF MECHANISM

Beverly W. Keese and Charles A. Cook, Oshkosh, Wis., assignors, by mesne assignments, to Rockwell Spring and Axle Company, Coraopolis, Pa., a corporation of Pennsylvania Application August 7, 1947, Serial No. 767,230

1 Claim. (Cl. 74—15.84)

This invention relates generally to motor vehicle drive mechanisms, and more specifically to improved power take-off mechanisms therefor operable simultaneously with the vehicle driving mechanism or independently thereof and is an improvement over the power take-off mechanism shown in the pending application of Keese et al. Serial No. 664,185 filed April 23, 1946, which was granted July 4, 1950, as United States Letters Patent No. 2,513,333.

Because of the length of the power take-off shaft there is inherently a slight axial misalignment between the engine flywheel and the power take-off shaft. The coupling between the flywheel and shaft must compensate for such misalignment. It has been discovered that because of the engine torque variations the connection between the flywheel and the power take-off shaft will not stand up if there is any rotation of either the flywheel or the power take-off shaft with respect to the coupling.

It is, therefore, the primary object of this invention to provide a connection between an engine driven flywheel and a power take-off mechanism which will compensate for misalignments between the flywheel and the power take-off mechanism and will yet be substantially unaffected by the minute fluctuation of the driving torque on the flywheel.

A further object of this invention is to provide a coupling means for connecting an engine driven flywheel to a power take-off mechanism comprising a flexible member rigidly secured to said flywheel and to a driven part of said power take-off mechanism.

A still further object of this invention is to provide a coupling means between an engine flywheel and driven member comprising a ring of flexible sheet material rigidly connected at circumferentially spaced points to the flywheel and to the arms of a spider slidably splined on the driven member.

An additional object of this invention is to provide the input shaft of a power take-off mechanism with a spider member non-rotatably mounted thereon and a coupling member flexible in the axial direction of the input shaft and rigid in its peripheral direction connected to the spider member and to the engine driven flywheel.

Another object of this invention is to provide a power driven unit including a housing and input shaft geared to the transmission drive shaft and a pulley shaft journalled in the housing; and clutch means in the housing operable to optionally cause the input shaft to drive the pulley shaft.

A still further object of this invention is to provide a differential assembly comprising a main shaft having a plurality of axially extending lubricant receiving grooves, a pair of differential side gears journalled on the main shaft member and receiving lubricant through the grooves, a differential spider member carrying a plurality of differential pinions meshed with the side gears; and key members engaged in the lubricant receiving grooves and rigidly connecting said spider member with the main shaft.

These and other objects will become apparent as the specification continues with reference to the annexed drawings wherein:

Figure 5 is a plan view with certain parts shown in section showing the final differential wheel drive mechanism and Figure 6 is a vertical sectional view along line 6—6 of Figure 5 showing the mounting of the differential spider member.

A preferred practical embodiment of the invention is illustrated in the drawings wherein like reference characters designate like parts throughout the several views.

Figure 1:
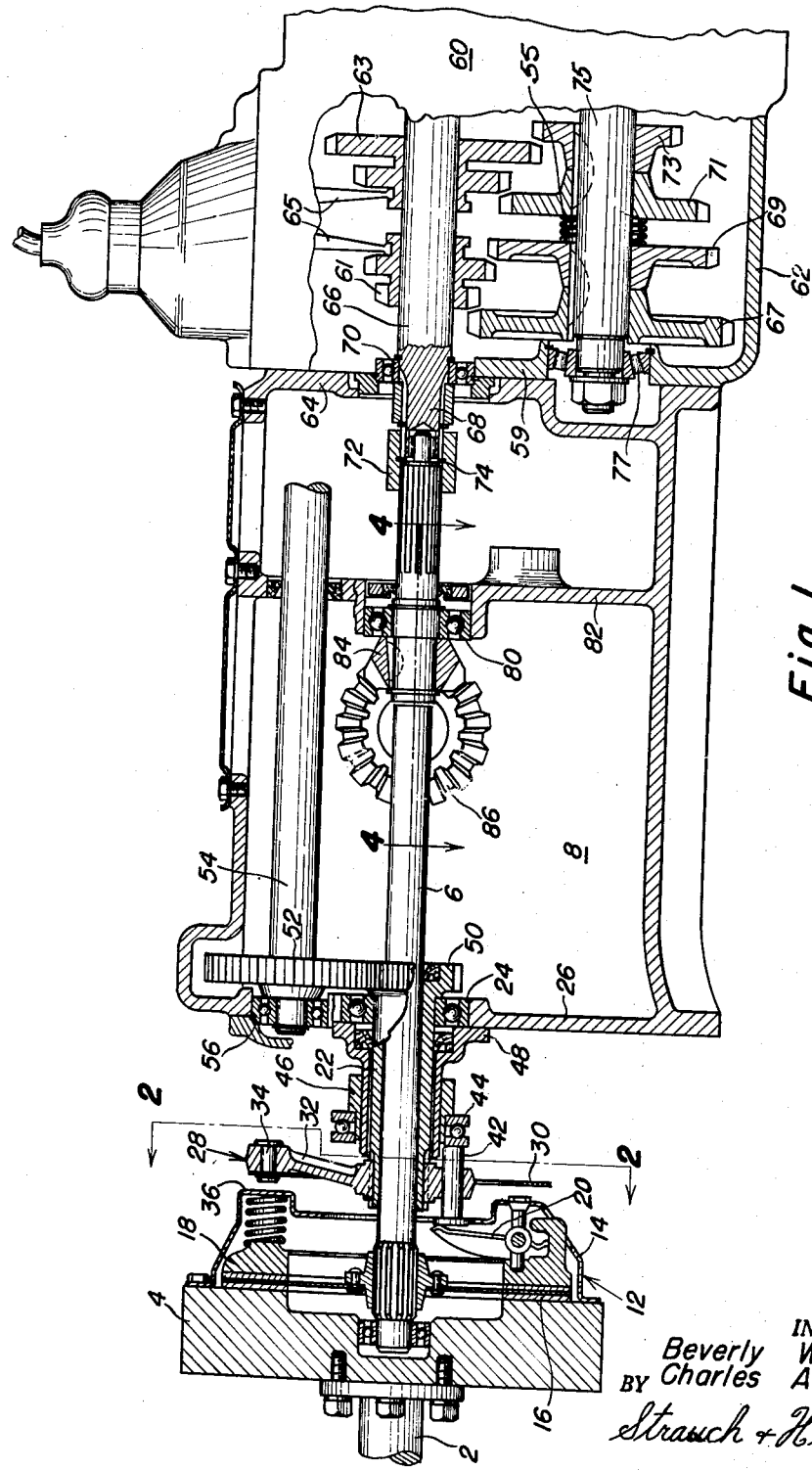
Figure 1 is a longitudinal sectional view illustrating the power take-off mechanism of this invention.
Figure 4:
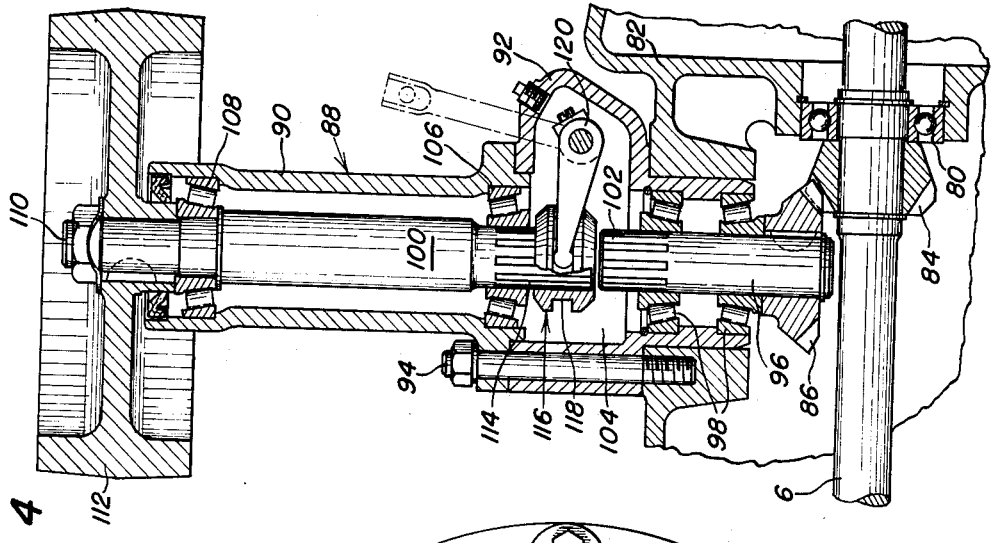
Figure 4 is a horizontal sectional view taken along line 4—4, Figure 1, illustrating the pulley power take-off mechanism of this invention.

An engine driven shaft 2 is conventionally connected to drive a flywheel 4. A transmission drive shaft 6 is axially aligned with the engine driven shaft and has one extremity journalled in the flywheel and extends rearwardly into a housing 8 suitably mounted on the vehicle frame or chassis. A conventional friction clutch mechanism 12 is enclosed by a housing 14 secured for rotation with the flywheel. A clutch plate member 16 is non-rotatably secured on transmission drive shaft 6 and a driven clutch member 18 carried by the clutch housing is operable by means of fingers 20 to releasably connect the clutch plate for rotation as a unit with said housing and the flywheel.

Figure 2:
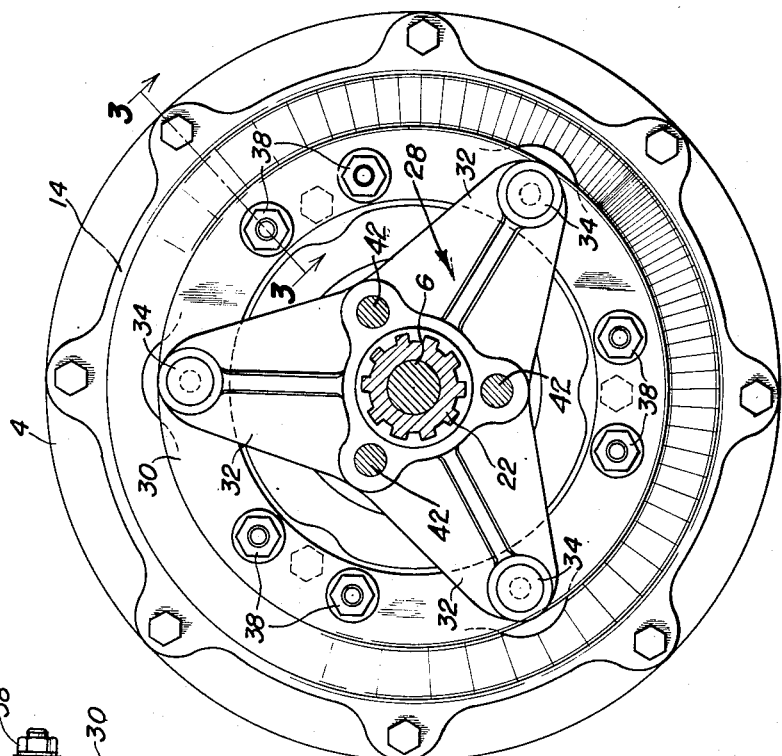
Figure 2 is a transverse section taken along line 2—2 of Figure 1 illustrating the means for coupling the power take-off means to the flywheel.
Figure 3:
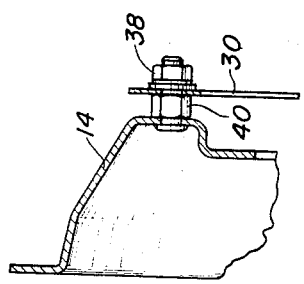
Figure 3 is a detail sectional view taken along line 3—3 of Figure 2 illustrating the method of connecting the coupling means to the engine flywheel.

Tubular sleeve or shaft 22 is concentric about transmission drive shaft 6 and is journalled in bearing 24 mounted in front wall 26 of the auxiliary housing 8. A spider member 28 is non-rotatably and slidably splined on the tubular shaft and together with that shaft comprises a power input means for a power take-off mechanism. Annular coupling member 30 comprising a ring of flexible sheet steel is non-rotatably and rigidly connected at circumferentially spaced points to arms 32 of said spider member 28 by any conventional means such as rivets 34. Intermediate of the arms 32 coupling member 30 is non-rotatably and rigidly connected to face 36 of clutch housing 14 by means of nut members 38 clamping the coupling to shouldered studs 40 riveted to the clutch housing. Preferably, as shown in Figure 2, member 30 is connected with the housing at spaced points between the spider arms which are equi-distant from the adjacent rivets 34.

It is now readily apparent that tubular shaft 22 is connected by means of spider 28, coupling member 30 and clutch housing 14 for constant rotation by the engine driven flywheel 4, and any rotative movement of said shaft or the flywheel with respect to the coupling member is effectively precluded.

Pins 42 corresponding in number to the number of clutch fingers 20 are slidably mounted in apertures in the hub of spider 28. These pins at one of their ends are provided with heads for bearing contact against the inner ends of the respective fingers 20 and at their other ends have contact with a thrust bearing 44 carried by a collar 46 slidably mounted on the hub extension of the flanged cap 48 secured to the wall 26 of housing 8 which retains bearing member 24 against outward axial movement therefrom. Any conventional means may be provided for shifting the collar 46 to actuate the clutch fingers 20 and disconnect the clutch plate 16 and transmission drive shaft 6 from the source of power.

The tubular shaft 22 at its rear end within housing 8 is provided with a gear 50 which is in constant mesh with a gear 52 splined or otherwise fixed on the forward end of the power take-off drive shaft 54. The power take-off shaft is journalled in bearing 56 mounted in the front wall of housing 8 and extends rearwardly where it is connected to a power take-off speed reduction gear box (not shown) which is described in detail in said Keese et al. patent.

A variable speed transmission mechanism 60 having a housing 62 is secured to rear wall 64 of housing 8 by any conventional means. Input shaft 66 of the transmission mechanism is provided with a splined extremity 68 projecting into a rear end compartment of housing and is journalled in bearing member 70 mounted in front wall 59 of housing 62. The input shaft 66 is axially aligned with transmission drive shaft 6 and is provided with a suitable bearing mounted in its extremity 68 for journalling the extremity of the drive shaft.

An internally splined sleeve member 72 couples the extremities of the shafts 6 and 66 and a snap ring 74 engaging the inner periphery of said sleeve and projecting into a space between the shafts prevents the axial movement of the sleeve with respect to the shafts.

Gear assemblies 61 and 63 are slidably splined on transmission shaft 66. Conventional means, such as lever members 65, is associated with said gear assemblies in order that they may be slidably moved into selected engagement with any one of gear members 67, 69, 71 or 73 which are secured non-rotatably on output shaft 75. Resilient means, such as compression spring 55, is disposed between gears 69 and 71 thereby causing them to yieldably resist axial forces incident to their engagement with gear assemblies 61 and 63 respectively.

Transmission output shaft 75 is parallel to shaft 66 and is journalled in bearing member 77 mounted in front wall 59 and is journalled in bearing member 79 mounted in intermediate wall 81 of housing 62.

The differential drive mechanism for the vehicle wheels is contained in housing 62 and includes a transversely positioned main shaft 83, preferably located with its axis disposed in a common horizontal plane with the axis of transmission output shaft 75. The shaft 83 has a plurality of longitudinally extending oil distributing grooves 85 formed in its periphery and a spider 87 is non-rotatably held on the shaft by means of cylindrical key members 89 cooperating with the grooves 85 and with keyways in the spider. The spider 87 carries a plurality of differential pinion members 91 meshed with side gear members 93 which are journalled on main shaft 83 and receive lubricant through grooves 85. Side gear members 93 are provided with integral sleeves 95 that extend axially outward from spider 87. Shaft 83 and sleeves 95 are rotatably supported on the opposite side walls of housing 62 by the roller bearings 97.

Brake drum members 99 are splined on the outer extremities of the sleeves 95 which extend outside of housing 62 and are held against axial movement by means of retainer members 101 internally and threadedly engaged with the sleeves. Conventional brake shoe means (not shown) is attached to the housing and is adapted to engage drum members 99 and thereby lock the sleeve members and side gears against rotation.

A ring gear 103 is secured to the spider member 87 by means of screws and is meshed with a bevel pinion 105 provided on the extremity of transmission output shaft 75 thereby drivingly connecting the output shaft to the differential unit.

A spur pinion 107 is provided on each sleeve 95 between the side gear 93 and the journal bearing 97. Spur pinions 107 are drivingly engaged with large reduction gears 109 which are keyed or splined to the inner ends of the driving axle shafts 111 for the respective traction wheels (not shown) of the vehicle. Shafts 111 are journalled in bearings 113 mounted in housing arms 115 which are secured to housing 62 by any conventional means.

When the vehicle is in operation clutch housing 14 is constantly rotated by engine flywheel 4 and is connected by coupling member 30 to rotate spider member 28 and tubular shaft 22 and to thereby constantly rotate the power take-off drive shaft 54. The coupling member being non-rotatably and rigidly connected to the clutch housing as well as to the spider member eliminates the pounding action on the coupling connections due to the minute fluctuation of the engine speed and thereby greatly increases the life of the coupling connections. Any slight angular misalignment between the axis of rotation of flywheel 4 and the axis of rotation of tubular shaft 22, which would throw the plane of rotation of clutch housing face 36 out of parallel with the plane of rotation of spider arms 32, will be permitted by the resiliently flexible coupling member 30. The coupling member being flexible and resilient in the axial direction of the clutch housing and the spider member and substantially rigid circumferentially thereof connects the clutch housing to the spider for unitary rotation while at the same time flexibly connecting the housing and the spider in their axial direction. It can therefore readily be seen that the axial distance between clutch housing face 36 and any of the arms 32 of spider 28 may vary with fluctuations in the transmission of power from the clutch housing to the spider without ill effect upon the coupling member or its connections.

Drive shaft 6 is journalled in bearing member 80 mounted in intermediate wall 82 of the auxiliary housing and a bevel drive gear 84 is non-rotatably mounted on the shaft just forwardly of the wall. A power driven mechanism is mounted on the housing 8 and is provided with a driven bevel gear member 86 meshed with the drive gear member 84 on the transmission drive shaft. The power driven mechanism is provided with a housing member 88 which for accessibility comprises a base section 92 and a sleeve section 90.

Stud members 94 passing through a flange on sleeve section 90 and through base section 92 secure the power driven unit rigidly to housing 8. A cylindrical projection of the base section is piloted in a bore in the housing wall thereby horizontally aligning the power driven mechanism with the transmission drive shaft 6. Driven bevel gear member 86 is non-rotatably mounted on a stub input shaft 96 which is journalled in bearings 98 mounted in the cylindrical projection of the base section of housing 88. The shaft is provided with a splined extremity 102 extending into the housing base chamber 104.

Sleeve section 90 of housing 88 is provided with an extension piloted in the base section thereby aligning the two sections. A shaft 100, axially aligned with stub shaft 96, is journalled in bearing members 106 and 108 mounted in the sleeve section 90. One extremity 110 of the shaft extends axially outward of the sleeve section and is provided with a pulley or other drive member 112 non-rotatably secured thereon which is adapted to be drivingly connected by means of a belt (not shown) to drive another mechanism or implement. The other extremity 114 of the shaft 100 is splined and extends into chamber 104 of housing base section 92.

A clutch member 116 comprising an internally splined sleeve having an annular groove 118 about its outer periphery is slidably mounted on extremity 114 of the shaft 100. Yoke member 120 operatively associated with groove 118 of the clutch member is operable by any conventional mechanism for actuating the clutch member to engage said member with the splined extremity 102 of stub shaft 96 causing the stub shaft and shaft 100 to rotate as a single unit.

When the friction clutch 12 is engaged, as is shown in Figure 1, the transmission drive shaft 6 is rotated with engine flywheel 4. Coupling sleeve 72 connects transmission drive shaft 6 to rotate input shaft 66 of transmisssion 60 whereby power is supplied to the vehicle wheels (not shown). Bevel drive gear 84 on the transmission drive shaft rotates driven gear 86 and stub shaft 96 of the pulley power take-off mechanism. The actuation of yoke member 120 engages clutch member 116 with the stub shaft, causing power take-off shaft 100 to rotate with the stub shaft. This arrangement permits the power take-off shaft 100 and member 122 to remain idle when the use of the power take-off unit is not required.

The invention may be embodied in other specific forms without departing from the spirit or essential characteristics thereof. The present embodiments are therefore to be considered in all respects as illustrative and not restrictive, the scope of the invention being indicated by the appended claim rather than by the foregoing description, and all changes which come within the equivalency of the claim are therefore intended to be embraced therein.

What is claimed and desired to be secured by United States Letters Patent is:

In a vehicle having a main housing enclosing a variable speed transmission, a final drive mechanism for the vehicle wheels and a rotatably mounted power take-off drive shaft extending longitudinally of said main housing independently of said transmission, an engine driven flywheel, a clutch housing secured to said flywheel, releasable clutch mechanism having a plurality of operating fingers within said clutch housing, a longitudinally extending transmission drive shaft journalled in said main housing and projecting into said clutch housing for drive connection with one side of said clutch mechanism whereby said transmission drive shaft has a releasable clutch connection with said flywheel, a sleeve coaxial with said transmission drive shaft constantly drive connected at opposite ends to said flywheel and said power take-off drive shaft whereby the latter may be driven while the clutch is disengaged, said drive connection between the flywheel and the sleeve comprising a multi-armed spider slidably splined on said sleeve so as to be non-rotatable therewith and capable of small axial shift with respect thereto and an axially flexible, circumferentially rigid sheet metal annulus rigidly secured at circumferentially spaced portions to said clutch housing and the outer ends of the spider arms respectively, a clutch control collar slidably mounted on said main housing for movement axially of said sleeve, and a plurality of pins slidably supported on said spider and passing therethrough operably extending between said clutch collar and said clutch mechanism fingers.

References Cited in the file of this patent

UNITED STATES PATENTS

| Number | Name | Date |
| --- | --- | --- |
| 1,172,525 | Hanchett | Feb. 22, 1916 |
| 1,455,242 | Corgiat, Jr., et al. | May 15, 1923 |
| 1,506,400 | Wynne | Aug. 26, 1924 |
| 1,546,857 | Mueller et al. | July 21, 1925 |
| 1,629,707 | Hudson | May 24, 1927 |
| 1,804,193 | Winther | May 5, 1931 |
| 1,828,028 | Church | Oct. 20, 1931 |
| 1,993,405 | Heitshu | Mar. 5, 1935 |
| 2,251,722 | Thomas | Aug. 5, 1941 |
| 2,290,835 | Lorimer | July 21, 1942 |
| 2,331,781 | Hollander | Oct. 12, 1943 |
| 2,349,880 | Orelind | May 30, 1944 |
| 2,513,333 | Keese et al. | July 4, 1950 |